United States Patent [19]
Walker

[11] 3,993,894
[45] Nov. 23, 1976

[54] DUAL EDGE DETECTOR FOR BAR CODES
[75] Inventor: Donny R. Walker, Carrollton, Tex.
[73] Assignee: Recognition Equipment Incorporated, Dallas, Tex.
[22] Filed: Dec. 18, 1975
[21] Appl. No.: 642,144

[52] U.S. Cl. ............... 235/61.11 E; 340/146.3 AG
[51] Int. Cl.² ...................... G06K 7/10; G08C 9/06
[58] Field of Search .............. 235/61.11 E, 61.6 E; 360/41; 340/146.3 R, 146.3 AG; 250/220 C

[56] References Cited
UNITED STATES PATENTS

| | | | |
|---|---|---|---|
| 3,719,934 | 3/1973 | Behr et al. | 360/41 |
| 3,892,950 | 7/1975 | Dodson | 235/61.11 E |
| 3,912,909 | 10/1975 | Harrison | 235/61.11 E |

*Primary Examiner*—P. Canney
*Attorney, Agent, or Firm*—John E. Vandigriff

[57] ABSTRACT

Printed bar codes which are either biphase modulated or bar-no-bar modulated are read as they pass an optical sensor. The video signal generated thereby is given a waveform having a constant reference level within an amplitude envelope of constant magnitude. The signal then is differentiated to provide a bipolar waveform having character dependent properties. The bipolar waveform is applied to a synchronizer to establish a digital synchronization waveform defining the time periods during which bar signals may occur. The bipolar waveform also is separated into positive and negative halves which are integrated separately and compared to a predetermined threshold to detect the presence of a bar. When a bar is present, the time of occurrence of the bar signal peak is correlated with the synchronization signal to identify either a logic one or a logic zero representation from the half-period position of the bar signal.

8 Claims, 10 Drawing Figures

TABLE I

DUAL EDGE DETECTOR FOR BAR CODES

FIELD OF THE INVENTION

This invention relates to systems for reading bar encoded data fields, and more particularly to the identification of a bar through both leading and trailing edge detection.

PRIOR ART

In the capture of bar-encoded data printed on a document, an optical sensor generates what is termed a raised cosine output signal from a signal bar. Thereafter, the presence or the absence of a raised cosine pulse is sensed, and the decoding of the resulting binary message in accordance with the encoding scheme is carried out.

In order to improve the signal-to-noise ratio of the information signal presented to a bar code reader, fluorescent inks have been employed in the printing of bar codes. Differing paper types having color variations thereon, and bar overprints caused by ink stamp impressions, produce distortions in the optical sensor signal. The raised cosine pulse generated by the sensor may appear superimposed upon a DC pedestal of low frequency noise, and the leading or trailing edge of the pulse may be distorted when the corresponding bar overlaps areas of differing colors.

A further complication in the detection of bars results from phase encoding. An overlap of cosine pulses may occur when bars are present in adjacent halves of contiguous bar time periods during which bars are expected.

TABLE I of the drawings illustrates a biphase modulated binary information signal. Each bar time periods is divided into halves in which may appear either a logic 1–0 or a logic 0–1 code. Adjacent bars may occur in contiguous bar time periods as shown by the bar pattern in time periods 0 and 1. When such adjacent bars are optically sensed, a waveform overlap causing intersymbol interference may occur as illustrated by the video waveform of TABLE I.

An additional problem encountered in prior bar code reading systems results from the method used to synchronize a bar code detection with the incoming data stream. Methods which merely reset and measure a bar time period from the occurrence of an immediately preceding bar are not suitable for reading biphase modulated data.

Heretofore, bar code readers have employed fixed reference comparators with either AC couple and DC restore circuits, or an AGC circuit to distinguish bar signals from background noise. AC couple and DC restore circuits have a limited dynamic range, and are susceptible to signal attenuation caused by overprint and color variations. The operation of AGC circuits has been based upon a DC signal level which includes low frequency noise superimposed upon the information signal. The bar amplitude after AGC, therefore, is established relative to a peak signal formed from sensing the same document rather than from sensing a bar on a white background.

The reliability of such prior bar code reading systems has been reduced further by a dependency upon leading edge detection. The leading edge bar signal under certain overprint and color variation conditions may be virtually nonexistant. In such cases bars are not detected.

The present invention provides a bar code reading system for detecting either bar-no-bar or phase modulated bar codes particularly useful in connection with fluorescent bars. The effects of low frequency noise and intersymbol interferences are removed, and both leading and trailing edge detection is employed. Synchronization is provided from clocking information inherent to the incoming data stream to accommodate demodulation of a biphase modulated data field.

SUMMARY OF THE INVENTION

A video signal is generated by an optical sensor and is conditioned to provide a waveform having a constant reference level. The conditioned signal then is differentiated to form a bipolar waveform. The bipolar waveform is applied to a ringing filter synchronizer to produce a digital synchronization signal, and also is separated into positive and negative half-waves. Each half-wave is integrated and compared to a predetermined threshold. If either half-wave equals or exceeds an amplitude threshold, a bar presence is indicated. The time of occurrence of a bar signal peak is correlated with the synchronization signal, and either a logic one or a logic zero representation is identified from the half-period position of the peak within a bar time period.

In one aspect of the invention, the ringing filter synchronizer provides a data clock formed from clocking information inherent to the incoming video signal.

In another aspect of the invention, a reading system is provided which may be readily altered to read either bar-no-bar or biphase modulated bar encoded data fields.

DESCRIPTION OF THE DRAWINGS

For a more complete understanding of the present invention and for further objects and advantages thereof, reference may now be had to the following description taken in conjunction with the accompanying drawings in which.

TABLE I is a waveform and timing diagram for a biphase modulated bar encoded data field.

DESCRIPTION OF PREFERRED EMBODIMENT

FIG. 1

Figure 1:
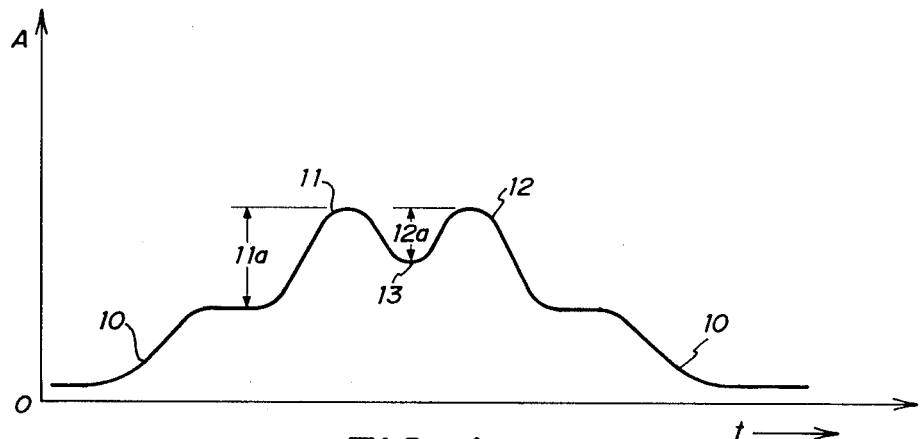
FIG. 1 is a diagram of a raised cosine waveform superimposed upon a low frequency pedestal.

FIG. 1 is an illustration of a video signal generated by an optical sensor scanning adjacent bars of a biphase modulated data field, with the document surface having color variations and overprint in the area of the data field.

A raised portion or pedestal 10 is caused by the occurrence of paper noise, which is low frequency noise generated in response to the sensing of the color variations or overprint. A curve portion 11 is a raised cosine curve generated from the sensing of a first printed bar, and a curve portion 12 is generated from the sensing of a second printed bar. The character of the valley 13 between curve portions 11 and 12 may depend upon color variations in the document background, and from the characteristics of the optical system used in conjunction with the optical sensor. By inspection of FIG. 1, it is seen that the leading edge of curve portion 11 has a magnitude 11a significantly greater than the magnitude 12a of the leading edge of curve portion 12. A bar represented by curve portion 11, therefore, is easily detectable. A bar represented by curve portion 12, however, may not be detected because of the leading edge attenuation.

FIG. 2

Figure 2:
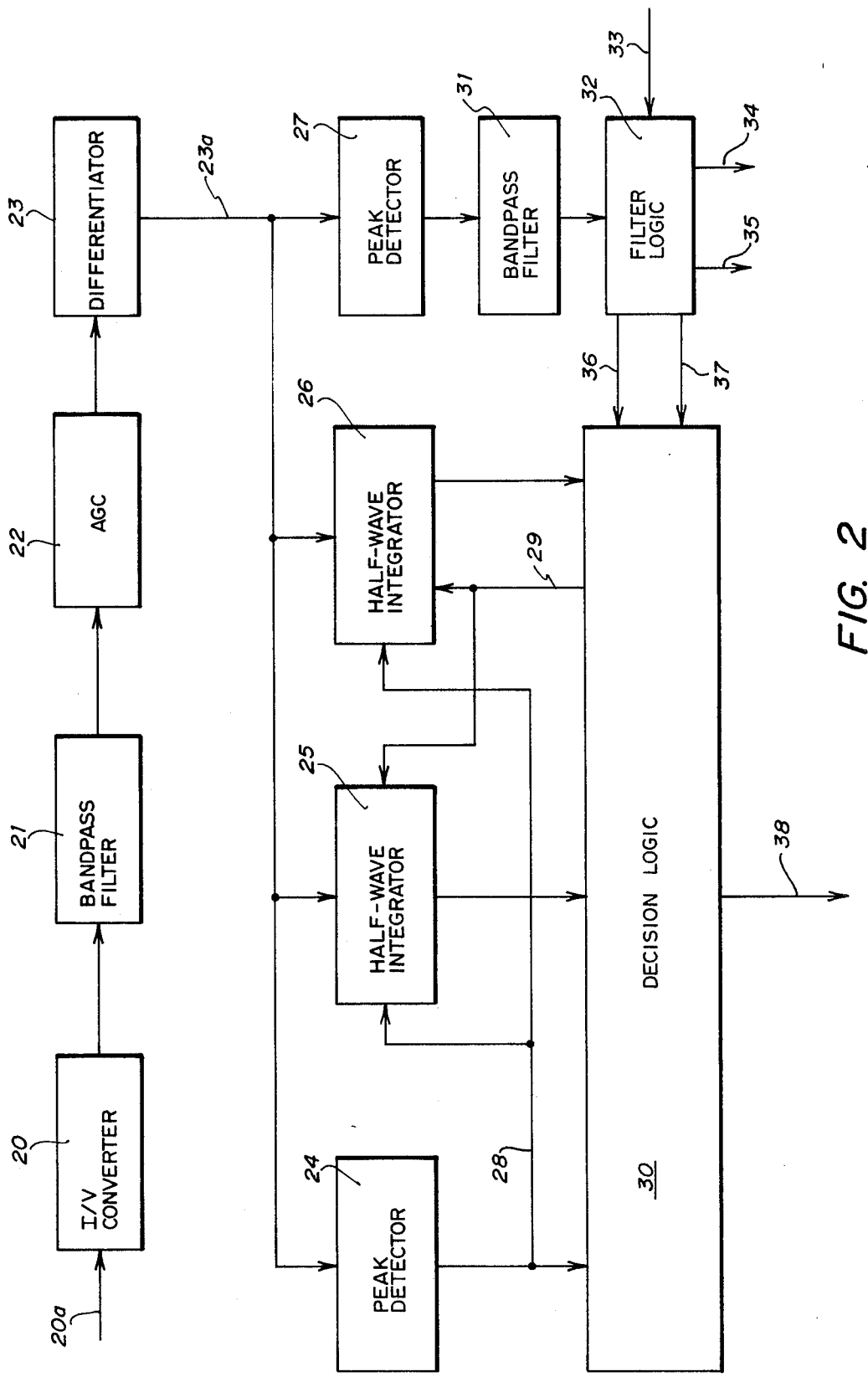
FIG. 2 is a functional block diagram of a bar code reading system embodying the invention.

FIG. 2 illustrates a bar code reading system in which both the leading and trailing edges of a bar video signal are operated upon to detect the presence of phase encoded flourescent bar codes.

A current to voltage converter 20 receives a video signal from an optical sensor along a conducting line 20a, and applies a voltage equivalent of the signal through a bandpass filter 21 to an automatic gain control (AGC) circuit 22. Filter 21 removes most of the low frequency paper noise from the input video signal. Such paper noise is represented by the pedestal 10 of FIG. 1.

The AGC circuit 22 operates on a peak-to-peak video signal substantially free of low frequency noise to provide a video signal of uniform amplitude. The video signal is applied to a differentiator 23, which further eliminates low frequency noise and provides a bipolar waveform to accommodate both the leading edge and trailing edge detection of responses to the sensing of bars in a bar encoded data field (hereinafter referred to as bar signals). The bipolar waveform is applied to a peak detector 24, a half-wave integrator 25, a half-wave integrator 26, and a peak detector 27.

As differentiation accents the high frequency noise while attenuating low frequency noise, further filtering is required before a reliable detection process may be executed. Such filtering may be accomplished through integration of the bipolar waveform. In order to retain the ability to detect leading and trailing edges of a bar signal substantially free of intersymbol interferences, the bipolar waveform is separated into positive and negative half-waves which are integrated separately. Integrator 25 operates upon the negative half-wave to provide a trailing edge signal, and integrator 26 operates upon the positive half-wave to provide a leading edge signal.

The outputs of integrators 25 and 26 are each connected to inputs of a decision logic unit 30, which also receives an input from peak detector 24. The output of detector 24 in addition is applied along a conducting line 28 to reset inputs of integrators 25 and 26. The reset inputs of integrators 25 and 26 are connected by way of a conducting line 29 to an output of logic unit 30.

Decision logic 30 may either discriminate between a logic zero or logic one representation of a bar occurring in a bit time period of a phase encoded data field, or detect the presence of a bar in a bar-no-bar encoded data field. A decision is output as non-return-to-zero (NRZ) data on a data channel 38.

Synchronization between the input video signal and the reading system is accomplished by a ringing filter synchronizer comprising peak detector 27, a bandpass filter 31 and a filter logic unit 32. Detector 27 operates upon the output of differentiator 23 to detect a bar signal peak, and converts the peak to a pulse which is normalized in both amplitude and width. Upon receiving a normalized pulse from detector 27, filter 31 generates a signal having twice the frequency of the input video signal. Filter logic unit 32 thereupon generates a corresponding digital signal which is applied along a conducting line 36 to logic unit 30. Logic unit 30 also receives a reset signal from document tracking logic (not shown).

Since the digital signal is at twice the frequency of the input video signal, both the leading and trailing halves of a bar time period may be defined therefrom to accommodate the reading of biphase modulated bar encoded data fields. The leading half of a bar time period hereinafter is referred to as a logic zero window, while the trailing half is referred to as a logic one window.

Filter logic unit 32 also generates a train of pulses along a conducting line 37 leading to logic unit 30. Each pulse signals where the end of a trailing edge of a bar signal would occur if the bar signal were within the logic one window of a bar time period. In addition, logic unit 32 generates a data strobe signal comprising one pulse per bar time period which is applied along a conducting line 35 to succeeding systems. Further, upon the occurrence of a normalized pulse at the output of detector 27, logic unit 32 issues a pulse along a conducting line 34 to initialize the succeeding systems for the reception of NRZ data on channel 38.

In operation, an input video signal is conditioned by converter 20, filter 21 and AGC unit 22 to provide a waveform having a constant reference level within an amplitude envelope of constant magnitude. The signal then is differentiated by differentiator 23 to further attenuate low frequency noise, and to provide a bipolar waveform for the accommodation of both leading edge and trailing edge detection of bar signals. The bipolar waveform is applied to the input of peak detectors 24 and 27, and effectively split into negative and positive half-waves by detector 24 working in combination with half-wave integrators 25 and 26, respectively. Detector 24 resets integrator 26 when the differentiator output changes from a positive to a negative going waveform. In like manner, detector 24 resets integrator 25 when the differentiator output changes from a negative to a positive going waveform. Integrator 25 thereby provides a trailing edge signal, while integrator 26 provides a leading edge signal for the detection of a bar.

Differentiator 23 is sensitive to the slope of the input video signal. When the input video signal passes through a peak, the differentiated signal transitions through a zero value. The zero crossing is detected by peak detector 27, which converts the video peak into an amplitude and width normalized pulse. The normalized pulse is applied to filter 31 which in response generates a signal having twice the frequency of the input video signal. The output of filter 31 in turn is converted by filter logic 32 into a digital synchronization signal which is applied to logic unit 30 by way of line 36. As the digital signal is at twice the frequency of the input video signal, biphase modulated bar encoded data fields may be accommodated. As before described, logic unit 32 further issues end of trailing edge signals along line 36, and data strobe and data initialization signals along lines 35 and 34, respectively. Logic unit 32 also receives tracking signals by way of line 33, which resets the logic unit prior to the sensing of a field of data printed on a document surface.

Decision logic 30 correlates the outputs of detector 24, and integrators 25 and 26 with the digital synchronization signal to generate a bar decision. More particularly, the output of each of the integrators is compared to a fixed threshold level. If the amplitude criterion is met by the output of either integrator, the output of detector 24 is sensed to determine whether a bar signal peak has occurred. The time of occurrence of a peak is used to establish the position of a bar signal within a bar time period as defined by the synchronization signal. If a bar occurs in a logic one window, a logic one decision is made. If a bar occurs in a logic zero window, however, a logic zero decision is made. The decision is stored in logic unit 30 until strobed out as NRZ data on line 38.

It is to be understood that the detection method herein disclosed is applicable for the detection of any sinusoidal pulse, particularly where the pulse may be distorted by partial pulse attenuation. In addition, the method of synchronization may be used to provide a data clock for any system wherein the data received inherently contains clocking information.

FIG. 3

Figure 3:
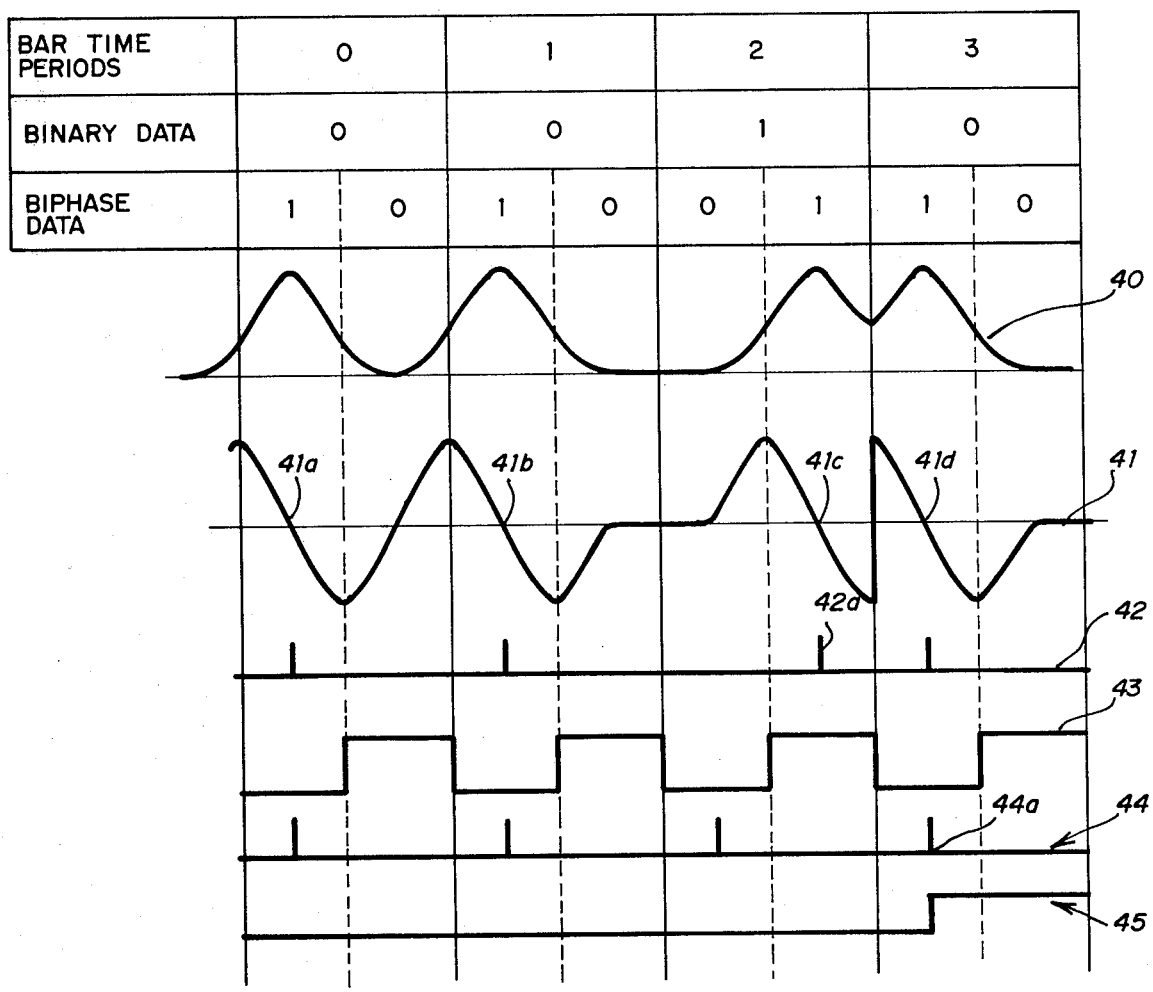
FIG. 3 is a timing diagram of waveforms illustrating the operation of the system of FIG. 1.

FIG. 3 is a waveform and timing diagram illustrating the operation of the system of FIG. 2. When a biphase modulated bar code data field pass through registration with an optical sensor, a video signal is generated which is conditioned by convertor 20, filter 21 and AGC circuit 22. The conditioned waveform is illustrated by waveform 40, where an inter-symbol interference is shown between bar time periods 2 and 3 of FIG. 3.

When the conditioned waveform 40 is applied to differentiator 23, a waveform 41 is produced. The positive portions of waveform 41 provide a leading edge signal, while the negative portions of the waveform provide a trailing edge signal. As may be seen by an inspection of waveform 41, the conditioning and differentiation of the input video signal provides a bipolar waveform having a constant reference level within an amplitude envelope of uniform magnitude. The zero crossover points 41a–41d of waveform 41 occur at the peaks of waveform 40.

When a bar presence is indicated by the output of either integrator 25 or integrator 26, logic 30 senses the output of detector 24 as represented by a waveform 42. Each pulse of waveform 42 indicates the time of occurrence of a bar signal peak in waveform 40.

By way of example, when a bar signal occurs in a logic one window as illustrated in bar time period 2 of FIG. 3, a pulse 42a is generated by detector 24. Logic 30 senses pulses 42a, and correlates the time of occurrence of the pulse with a digital synchronization signal 43 on line 36. Signal 43 defines the logic zero and logic one windows within each bar time period. Through such correlation, logic 30 may determine whether a bar signal represents a logic zero or a logic one in a corresponding binary information signal.

Upon receiving a next occurring pulse 44a of waveform 44 on line 37, logic 30 provides a NRZ output on channel 38 as illustrated by waveform 45. Waveform 44 comprises a train of pulses, with each pulse signalling the point in time where an end of trailing edge would occur if a bar signal were in a logic one window of a preceding bar time period.

FIG. 4

Figure 4:
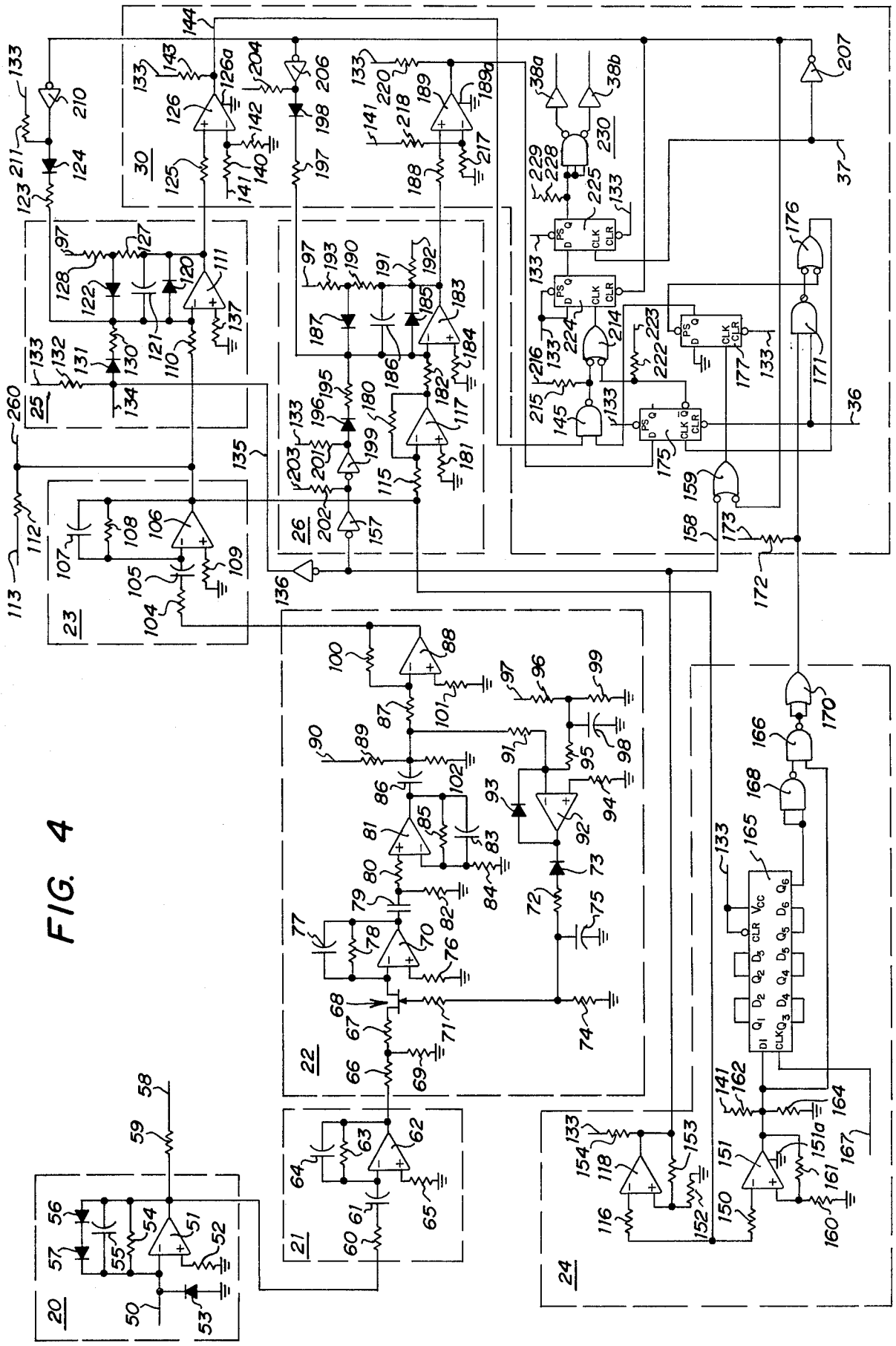
FIG. 4 is an electrical schematic diagram of signal conditioning circuits, a differentiator, half-wave integration circuits, a peak detector, and bar decision logic comprising the system of FIG. 2.

Converter 20, filter 21, AGC circuit 22, differentiator 23, detector 24, integrators 25 and 26 and decision logic 30 are illustrated in electrical schematic form in FIG. 4. In referring to the electrical schematics illustrated in the Figures, it is to be understood that the occurrence of a small circle at the input of a logic device indicates that the input is enabled by a logic 0. Further, a small circle appearing at an output of a logic device indicates that when the logic conditions for that particular device are satisfied, the output will be a logic 0.

A video current is generated by a photomultiplier tube (not shown) and carried by conducting line 50 to the negative input of a differential amplifier 51, the positive input of which is connected through a 27K-ohm resistor 52 to ground. Line 50 also is connected to the cathode of a diode 53, the anode of which is connected to ground. The output of amplifier 51 is applied through a 27K-ohm resistor 54 to the negative input of the amplifier, to one terminal of a 390 picofarad capacitor 55, and to the anode of a diode 56. A second terminal of capacitor 55 is connected to the negative input of amplifier 51. The cathode of diode 56 is connected to the anode of a diode 57, the cathode of which is connected to the negative input of amplifier 51.

Amplifier 51, resistors 52 and 54, capacitor 55, and diodes 53, 56 and 57 comprise converter 20 of FIG. 2.

The output of amplifier 51 also is connected to a tie point 58 by way of a 320 ohm resistor 59, and through a series RC network comprising a 3.9K-ohm resistor 60 and a 0.047 microfarad capacitor 61 to the negative input of a differential amplifier 62. The negative input of amplifier 62 further is connected through a 4.7K-ohm resistor 63 to the output of the amplifier, and through a 1000 picofarad capacitor 64 to the output of the amplifier. The positive input to amplifier 62 is connected through a 4.7K-ohm resistor 65 to ground. Amplifier 62, capacitors 61 and 64, and resistors 60, 63 and 65 comprise bandpass filter 21 of FIG. 2.

The output of amplifier 62 is applied through a 1.0K-ohm resistor 66 and a 220 ohm resistor 67 to the drain terminal of a field-effect transistor (FET) 68. A 100 ohm resistor 69 is connected between ground and a node intermediate to resistors 66 and 67.

The source terminal of FET 68 is connected to the negative input of a differential amplifier 70, while the gate terminal is connected through a 10K-ohm resistor 71 and a 1.0K-ohm resistor 72 to the anode of a diode 73. One terminal of a 180K-ohm resistor 74 is connected to a node intermediate to resistors 71 and 72, while a second terminal of resistor 74 is connected to ground. A first terminal of a 1.0 microfarad capacitor 75 is connected to the anode intermediate to resistors 71 and 72, and a second terminal of the capacitor is connected to ground.

The positive input to amplifier 70 is connected through a 2.2K-ohm resistor 76 to ground, and the negative input further is connected through a parallel RC circuit comprising a 27 picofarad capacitor 77 and a 12K-ohm resistor 78 to the output of the amplifier. The output of amplifier 70 also is applied through a 0.10 microfarad capacitor 79 and a 1.8K-ohm resistor 80 to the positive input of a differential amplifier 81. A 12K-ohm resistor 82 is connected between ground and a node intermediate to capacitor 79 and resistor 80.

The negative input to amplifier 81 is connected to one terminal of a 10 picofarad capacitor 83, and connected by way of a 1.80K-ohm resistor 84 to ground. The output of amplifier 81 is connected to a second terminal of capacitor 83, and applied through a 22K-ohm resistor 85 to the negative input of the amplifier. The output of amplifier 81 also is applied through a 0.10 microfarad capacitor 86 and a 22K-ohm resistor 102 to ground, and through capacitor 86 and a 10K-ohm resistor 87 to the negative input of a differential amplifier 88. An 820 ohm resistor 89 is connected between a tie point 90 and a node intermediate to capacitor 86 and resistor 87. Also connected to the node intermediate to capacitor 86 and resistor 87 is one terminal of a 15K-phm resistor 91, and a second terminal of which is connected to the negative input of a differential amplifier 92.

The output of amplifier 92 is connected to the cathode of diode 73, and to the anode of a diode 93 having cathode connected to the negative input of the amplifier. The positive input to amplifier 92 is connected through a 6.8K-ohm resistor 94 to ground. The negative input to amplifier 92 also is connected through a 15K-ohm resistor 95 and a 10K-ohm resistor 96 to a −15 volt supply 97, and through resistor 95 and a parallel RC network comprising a 1.0 microfarad capacitor 98 and a 1.2K-ohm resistor 99 to ground.

The output of amplifier 88 is connected through a 10K-ohm resistor 100 to the negative input of the amplifier, and the positive input of the amplifier is connected through a 5.1K-ohm resistor 101 to ground. Amplifiers 70, 81, 88 and 92 comprise with their associated networks the AGC circuit 22 of FIG. 2.

A conditioned input video signal at the output of aplifier 88 is applied through a 3.0K-ohm resistor 104 and a 390 picofarad capacitor 105 to the negative input of a differential amplifier 106. The negative input of the amplifier also is connected through a parallel RC circuit comprising a 56 picofarad capacitor 107 and 56K-ohm resistor 108 to the output of the amplifier. The positive input to amplifier 106 is connected through a 56K-ohm resistor 109 to ground. Amplifier 106, resistors 104, 108 and 109, and capacitors 105 and 107 comprise differentiator 23.

A differentiated video signal having a constant zero line is provided at the output of amplifier 106, which is connected through an 820 ohm resistor 112 to a tie point 113 and through an 8.2K-ohm resistor 110 to the negative input of a differential aplifier 111. The output of amplifier 106 also is connected by way of a conducting line 114 through a 12K-ohm resistor 115 to the negative input of a differential amplifier 117; and through a 1.00K-ohm resistor 116 to the negative input of a differential amplifier 118.

The negative input of differential amplifier 111 further is connected to the anode of a diode 120, to one terminal of a 220 picofarad capacitor 121, to the cathode of a diode 122, and through a 1.0K-ohm resistor 123 to the cathode of a diode 124. The positive input to amplifier 111 is connected through a 12K-ohm resistor 137 to ground. The output of amplifier 111 is applied through a 1.0K-ohm resistor 125 to the positive input of a differential amplifier 126, to the cathode of diode 120, to a second terminal of capacitor 121, and through a 2.7K-ohm resistor 127 to the anode of diode 122. The aode of diode 122 in addition is connected through an 8.2K-ohm resistor 128 to the −15 volt source 97, while the cathode of diode 122 is connected through a 1.5K-ohm resistor 130 to the cathode of a diode 131. The anode of diode 131 in turn is connected through an 820 ohm resistor 132 to a +5 volt source 133, to a tracking reset terminal 134, and by way of a conducting line 135 to the output of an inverter 136. Amplifier 111, resistors 110, 127, 128, 130 and 137, capacitor 121, and diodes 120, 122 and 131 comprise half-wave integrator 25.

The negative input to amplifier 126 is connected through a 10K-ohm resistor 140 to a +15 volt source 141, and through an 1.0K-ohm resistor 142 to ground. The output of amplifier 126 is applied by way of a conducting line 144 to one input of a NAND gate 145, and through an 1.0K-ohm resistor 143 to voltage source 133. An enable input 126a of amplifier 126 is grounded for a comparator operation.

Referring to differential amplifier 118, the negative input of the amplifier also is connected through resistor 116 and an 1.0K-ohm resistor 150 to the negative input of a differential amplifier 151. The positive input of amplifier 118 is connected to an 1.0K-ohm resistor 152 to ground, and through an 120K-ohm resistor 153 to the output of the amplifier. The output of amplifier 118 further is connected through an 1.0-ohm resistor 154 to the +5 volt source 133, and by way of a conducting line 156 to the input of an inverter 157 and to the input of inverter 136. In addition, the output of amplifier 118 is connected by way of a conducting line 158 to one input of a NOR gate 159.

The positive input to amplifier 151 is connected through a 2.49K-ohm resistor 160 to ground, and through a 0.68K-ohm resistor 161 to the output of the amplifier. An enable terminal 151a of amplifier 151 is connected to ground for a comparator operation. The output of amplifier 151 in addition is connected through a 2.0K-ohm resistor 162 to the +15 volt source 141, and through an 1.0K-ohm resistor 164 to ground. The output of aplifier 151 also is connected to the D1 input of a shift register 165, and to one input of a NAND gate 166.

Shift register 165 is comprised of six flip-flops connected in tandem. The output Q1 of a first flip-flop is connected to the D2 input of a second flip-flop, and the output Q2 of the second flip-flop is connected to the D3 input of a third flip-flop. In like manner, the Q3 output of the third flip-flop is connected to the D4 input of a fourth flip-flop, ad the Q4 output of the fourth flip-flop is connected to the D5 input of a fifth flip-flop. The Q5 output of the fifth flip-flop is connected to the D6 input of a sixth flip-flop to complete the tandem connection for a shift register operation. The Q6 output of the shift register is connected to two inputs of a NAND gate 168, the output of which is supplied to a second input of NAND gate 166. The clear (CLR) input to shift register 165 is connected to the powerinput (VCC) of the shift register, and to voltage source 133. The clock (CLK) input to shift register 165 is supplied by a 6.758 MHz crystal along a conducting line 167.

The output of NAND gate 166 is connected to two inputs of a NOR gate 170, the output of which is connected to one input of a NAND gate 171. The output of gate 170 further is connected through an 820 ohm resistor 172 to a tie point 173. Amplifiers 118 and 151, shift register 165, NAND gates 168 and 166, and NOR gate 170 comprise peak detector 24 of FIG. 2.

A second input to NAND gate 171 is a digital synchronization signal supplied by filter logic 32 by way of a conducting line 36, which also is connected to the clear (CLR) input of a flip-fop 175. The output of NAND gate 171 is applied to two inputs of a NOR gate 176, and to the preset (PS) input of a flip-flop 177. The output of gate 176 supplies a clock signal to the clock input of flip-flop 175.

Referring to amplifier 117, the negative input to the amplifier further is connected through a 12K-ohm resistor 180 to the output of the amplifier, while the positive input to the amplifier is connected through a 5.6K-ohm resistor 181 to ground. The output of amplifier 117 in addition is applied through a 12K-ohm resistor 182 to the negative input of a differential aplifier 183, the positive input of which is connected through a 12K-ohm resistor 184 to ground.

The negative input to amplifier 183 also is connected to the anode of a diode 185, to a first terminal of a 220 pocofarad capacitor 186, and to the cathode of a diode 187. The output of aplifier 183 is connected through a 1.0K-ohm resistor 188 to the positive input of a differential amplifier 189, to the cathode of diode 185, to a second terminal of capacitor 186, and through a 2.7K-ohm resistor 190 to the anode of diode 187. The output of amplifier 183 in addition is connected through an 820 ohm resistor 191 to a tie point 192. The anode of diode 187 further is connected through a 8.2K-ohm resistor 193 to the −15 volt source 97.

The cathode of diode 187 is connected through a 1.5K-ohm resistor 195 to the cathode of a diode 196, and through a 1.0K-ohm resistor 197 to the cathode of a diode 198. The anode of diode 196 is connected to the output of an inverter 199, and to the +5 volt source 133 by way of an 820 ohm resistor 201. The input to inverter 199 is supplied by the output of inverter 157, which is connected through an 820 ohm resistor 202 to a tie point 203. Inverters 157 and 199, and amplifiers 117 and 183 with their associated networks comprise half-wave integrator 26.

The anode of diode 198 is connected by way of an 820 ohm resistor 204 to voltage source 133, and to the output of an inverter 206. The input to inverter 206 is supplied by an inverter 207 receiving an end of trailing edge signal from filter logic 32 by way of a conducting line 37. The output of inverter 207 also is applied to the clear (CLR) input of a fip-flop 209, to a second input of NOR gate 159, and to the input of an inverter 210 having an output connected to the anode of diode 124. The output of inverter 210 further is applied through an 820 ohm resistor 211 to the voltage source 133.

The D input of flip-flop 209 is connected to the preset (PS) input of the flip-flop, and to the +5 volt source 133. The clock input to the flip-flop is supplied by a NOR gate 214 having a first input connected to the output of NAND gate 145, and having a second input connected to the Q output of flip-flop 175. The output of NAND gate 145 also is connected through a 820 ohm resistor 215 to a tie point 216.

The D input to flip-fop 175 is supplied by amplifier 189, the negative input of which is connected through a 1.0K-ohm resistor 217 to ground and through a 10K-ohm resistor 218 to a +15 volt source 141. The output of amplifier 189 in addition is connected through a 1.0K-ohm resistor 220 to the voltage source 133, and an enable input 189a of the amplifier is connected to ground for a comparator operation. The $\bar{Q}$ output of flip-flop 175 further is connected through an 820 ohm resistor 222 to a tie point 223.

The D input to flip-flop 177 is connected to ground, and the clock input is supplied by NOR gate 159. The clear input to flip-flop 177 is connected to voltage source 133, while the Q output of the flip-flop is connected to a second input of NAND gate 145.

The Q output of flip-flop 224 is connected to the D input of a flip-flop 225, the clear and preset inputs of which are connected to the +5 voltage source 133. The clock input to flip-flop 225 is connected to line 37. The Q output of flip-flop 225 is connected through an 820 ohm resistor 228 to a tie point 229, and to the input of a line driver 230. Driver 230 provides both a true output along a conducting line 38b and an inverted output along a conducting line 38a. Amplifiers 126 and 189, NAND gates 145 and 171, NOR gates 159, 176 and 214, and flip-flops 175, 177, 224 and 225, and line driver 230 comprise decision logic unit 30.

In operation, a sensor generated video current on line 50 is applied through converter 20 to bandpass filter 21, which attenuates both the high and low frequencies of the resulting voltage waveform.

The mid-frequency output of filter 21 then is operated upon by AGC circuit 22 which automatically controls the gain associated with the voltage waveform. The signal is maintained thereby at a normalized amplitude determined by voltage source 97 and resistors 96 and 99.

The AGC output of amplifier 81 is buffered by amplifier 88, and applied to differentiator 23. The differentiated signal then is applied to half-wave integrators 25 and 26, and to peak detector 24. Amplifier 118 of peak detector 24 resets integrator 25 when the output of differentiator 23 is positive, and resets the integrator 26 when the differentiator output is negative.

If a bar signal is detected in a logic one window of a bar time period as defined by the synchronization signal on line 36, a pulse is gated through NAND gate 171 and applied to both a leading edge network comprising flip-flop 175 and a trailing edge network comprising flip-flop 177. The leading and trailing edge outputs are combined in a network comprising NAND gate 145, NOR gate 214, and flip-flops 224 and 225. The combined signal then is applied through driver 230 to lines 38a and 38b of data channel 38.

It is to be understood that a peak will be detected in a leading edge of a bar signal after an amplitude criterion is met. By way of contradistinction, a peak for a trailing edge occurs before an amplitude criterion is met. In processing a leading edge signal, the threshold value provided by the amplifier 189 is applied to the D input of flip-flop 175. If a peak exceeding the threshold is detected during a logic one window of a bar time perod, the flip-flop 175 is clocked as is flip-flop 224 to provide a logic one decision.

Upon the detection of a bar signal peak during a bar time period, the preset input of flip-flop 177 is enabled to apply a logic one to the input of NAND gate 145. The trailing edge threshold provided by amplifier 126 also is applied to NAND gate 145. If the aplitude criterion for the trailing edge is met during a logic one window, flip-fop 224 is clocked as before to provide a logic one decision. Upon the occurrence of a next end of trailing edge signal on line 37, the decision is clocked through flip-flop 225 to line driver 230, and flip-flops 175 and 177 are reset.

FIG. 5

Figure 5:
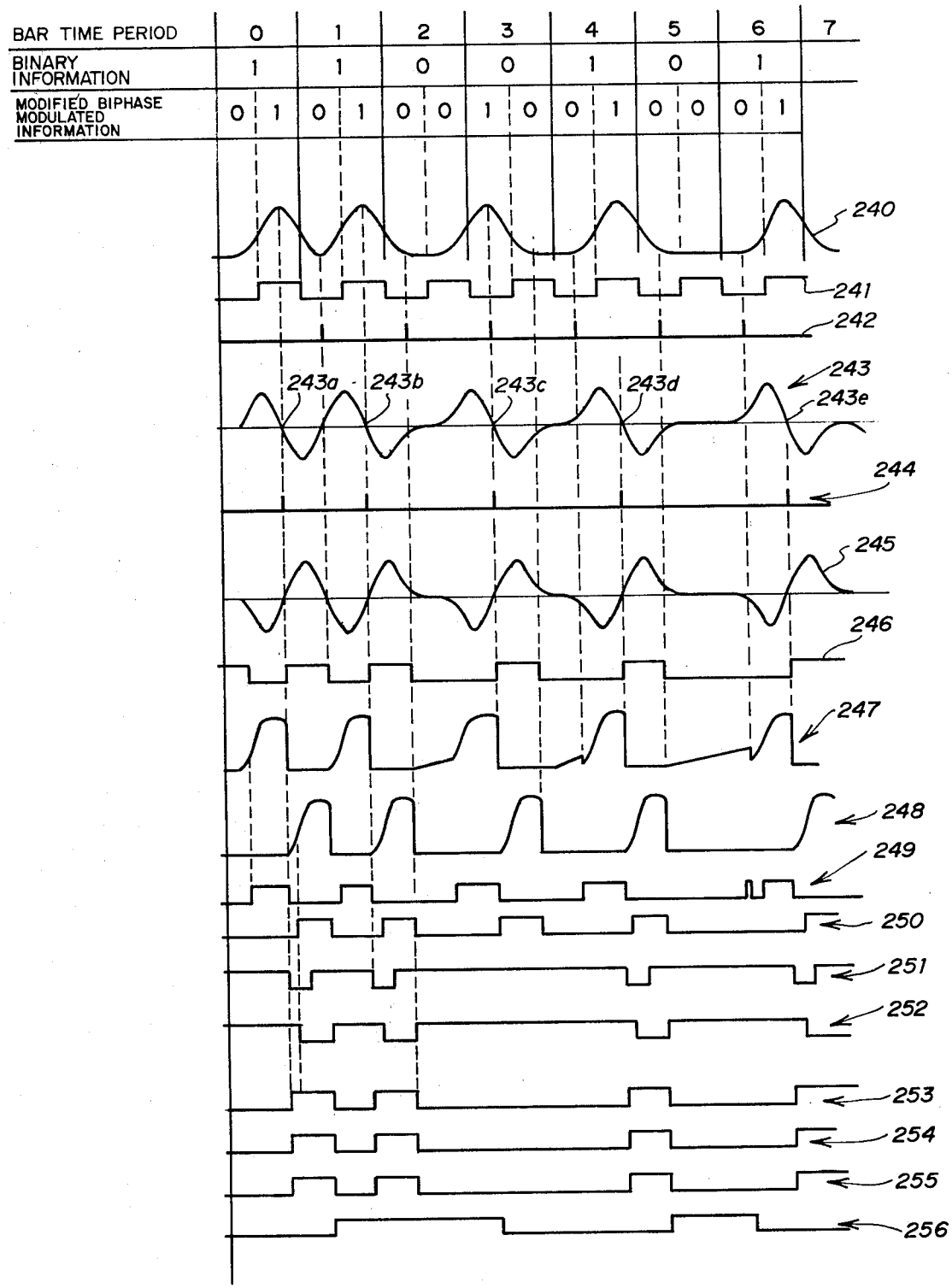
FIG. 5 is a timing diagram of waveforms illustrating the operation of the devices of FIG. 4.

FIG. 5 is a waveform and timing diagram of the operation of the system of FIG. 4. As illustrated in FIG. 5, a modified biphase modulation is effected by dividing each bar time period into half periods, and forcing a logic level transition between such half periods. More paticularly, a logic one in a binary information signal is replaced by a logic 0–1 code, and a logic zero following a logic one is replaced by a logic 0–0 code. A logic zero following a logic zero in an immediately preceding bar time period, however, is replaced by a logic 1–0 code.

Waveform 240 is a voltage waveform comprising a series of bar video signals taken at tie point 58. A synchronization waveform 241 is supplied by filter logic unit 32 along line 36, and comprises a train of pulses defining the leading and trailing halves of the bit time periods. Waveform 242, which also is supplied by logic unit 32, comprises a train of pulses signaling the end of a trailing edge of a bar signal if the bar signal were positioned in the trailing half of a bar time period.

Waveform 243 illustrates the differentiation of waveform 240, as taken at tie point 113, with zero-crossings 243a–243e occurring at the peaks of waveform 240. Waveform 244 illustrates the output waveform of peak detector 24 taken at tie point 173, such waveform being comprised of pulses occurring at the zero-crossings 243a–243e of waveform 243. When waveform 243 is applied to the negative inputs of amplifiers 117, 118 and 151, a waveform 245 appears at the output of amplifier 117 and a waveform 246 appears at the outputs of amplifiers 118 and 151.

The output of half-wave integrator 26 is illustrated by waveform 247 as taken at tie point 192. Each pulse comprising waveform 243. In like manner, a waveform 248 comprises pulses taken at the output of aplifier 111 of integrator 24, where each pulse results from the integration of a negative half-wave of waveform 243.

A comparison of waveforms 246–248 indicates that the pulse width of the positive going pulses comprising waveform 246 corresponds to the pulse width of a negative half-wave comprising waveform 243. Further, the trailing edges of the pulses comprising waveform 247 occur at the leading edges of the positive going pulses of waveform 246, while the trailing edges of the pulses comprising waveform 248 occur at the trailing edges of the waveform 246 pulses.

The output of amplifier 189, which compares the output of integrator 26 with a fixed threshold value, is illustrated by a waveform 249. Further, the output of amplifier 126, which compares the output of integrator 25 with a fixed threshold value, is illustrated by a waveform 250. During the time periods that the waveform 247 exceeds the fixed threshold value of amplifier 189, a pulse occurs in waveform 249. In like manner, the pulses comprising waveform 250 correspond to those time periods during which waveform 248 exceeds the fixed threshold value of amplifier 126. Thus, waveforms 247 and 249 form a basis for a leading edge decision, while waveforms 248 and 250 form a basis for a trailing edge decision.

The Q output of flip-flop 175 taken at tie point 223 provides a leading edge decision as illustrated by waveform 251. The leading edge of the negative going pulses comprising waveform 251 are aligned in time with the peaks of those bar signals of waveform 240 that occur in logic one windows.

A waveform 252 taken at tie point 216 illustrates the trailing edge decision output by NAND gate 145. The leading edge in time with the leading edge of those positive going pulses of waveform 250 that occur in bar time periods 0, 1, 4 and 6. In each of such bar time periods, a bar signal occurs in a logic one window. A waveform 253 illustrates a trailing edge decision taken at the Q output of flip-flop 177, whic provides one of two inputs to NAND gate 145 during the generation of waveform 252.

Waveforms 254 and 255 are a composite of waveforms 251 and 252 taken at the output of NOR gate 214 and the Q output of flip-flop 209, respectively.

Waveform 256 of FIG. 5 is the NRZ data provided at the Q̄ output of flip-flop 225, as sampled at tie point 229, and applied through driver 230 to succeeding systems by way of lines 38a and 38b of FIG. 4.

FIG. 6

Figure 6:
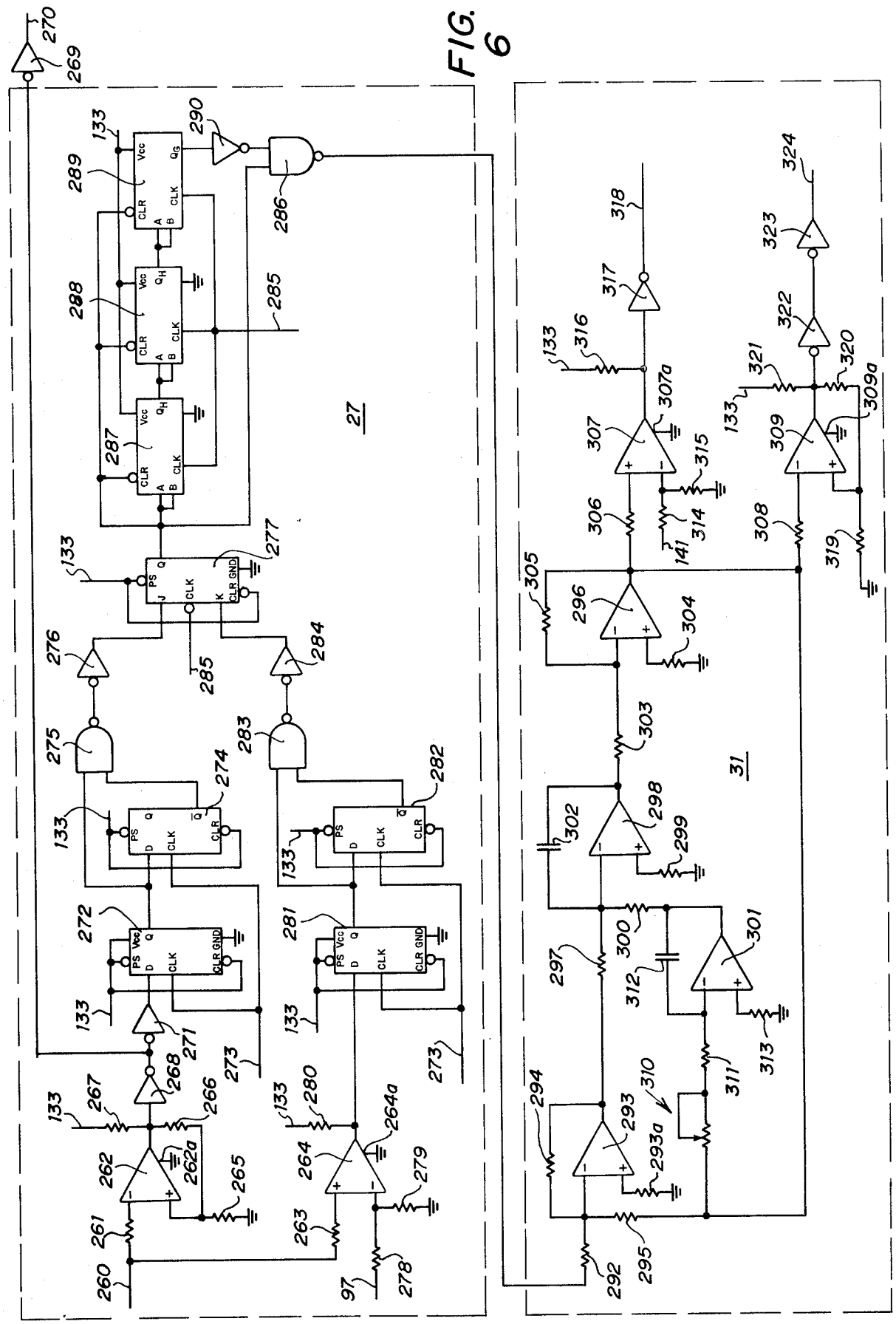
FIG. 6 is an electrical schematic diagram of a peak detector and a ringing filter comprising part of a ringing filter synchronizer embodied within the system illustrated in FIG. 2.

FIG. 6 is an electrical schematic diagram of peak detector 27 and bandpass filter 31. A differentiated input video signal is carried by a conducting line 260 leading from the output of amplifier 106 of FIG. 4. The signal is applied through an 1.0K-ohm resistor 261 to the negative input of a differential amplifier 262, and through an 1.0K-ohm resistor 263 to the positive input of a differential amplifier 264. The positive input to amplifier 262 is connected through a 2.32K-ohm resistor 265 to ground, and through a 17.8K-ohm resistor 266 to the output of the amplifier. An enable input 262a of the amplifier is connected to ground for a comparator operation. The output of amplifier 262 also is applied through an 1.0K-ohm resistor 267 to the $\mp 5$ volt source 133, and to the input of an inverter 268. Amplifier 262 and its associated network performs an amplitude normalization upon the differentiated input video signal on line 260.

The output of inverter 268 is applied through an inverter 269 to a conducting line 270 leading to filter logic unit 32, and through an inverter 271 to the D input of a flip-flop 272. The preset (PS), clear (CLR) and power (VCC) inputs to the flip-flop 272 are connected to voltage source 133, while the power ground terminal (GND) is connected to ground. A system clock signal generated by filter logic unit 32 is applied along a conducting line 273 to the clock (CLK) inputs of flip-flop 272 and a flip-flop 274. The Q output of flip-fop 272 is connected to the D input of flip-flop 274, and to one input of a NAND gate 275. The clear and preset inputs of flip-flop 274 are each connected to voltage source 133, and the Q̄ output of the flip-flop is connected to a second input of NAND gate 275. Flip-flops 274 and 272 comprise a leading edge detector.

The negative input to amplifier 264 is connected through a 100K-ohm resistor 278 to a −5 volt source 97, and through an 1.0K-ohm resistor 279 to ground. An enable input 264a of amplifier 264 is connected to ground for a comparator operation. The output of the amplifier 264 is connected through an 1.0K-ohm resistor 280 to voltage source 133, and to the D input of a flip-flop 281. Amplifier 264 and its associated network compare the differentiated input on line 260 to a threshold value at the negative input of the amplifier.

The preset, clear and power inputs of flip-flop 281 are each connected to the voltage source 133, while the power ground terminal is connected to ground. The Q output of flip-flop 281 is connected to the D input of a flip-flop 282, and to one input of a NAND gate 283. The preset and clear inputs to flip-flop 282 are each connected to voltage source 133, and the $\bar{Q}$ output of the flip-flop is connected to a second input of NAND gate 283. The clock inputs to flip-flop 281 and flip-flop 282 are provided by filter logic 32 along conducting line 273. Flip-flops 281 and 282 comprise a leading edge detector.

The output of NAND gate 283 is applied through an inverter 284 to the K input of a J-K flip-flop 277, and the output of NAND gate 275 is applied through an inverter 276 to the J input of the flip-flop. The clear and preset inputs of flip-flop 277 are each connected to voltage source 133, while the power ground terminal is connected to ground. A 1.675 MHz signal derived from a 6.758 MHz crystal oscillator (not shown) is applied along a conducting line 285 to the clock input of flip-flop 277. The Q output of flip-flop 277 is connected to a input of a NAND gate 286, and to the clear inputs of eight bit shift registers 287, 288 and 289. The Q output of flip-flop 277 also is applied to the A and B inputs of register 287.

The power inputs to register 287–289 are each connected to voltage source 133, while the power ground terminals of the registers are each connected to ground. The QH output of register 287 is connected to the A and B inputs of register 288, and the QH output of register 288 is connected to the A and B inputs of register 289. The QG output of register 289 in turn is applied through an inverter 290 to a second input of NAND gate 286. The clock inputs to registers 287–289 are each connected to a conducting line 285 carrying a 1.675 MHz signal derived from the before-mentioned crystal oscillator. Shift registers 287, 288 and 289 form a pulse width normalizer.

Amplifiers 262 and 264, inverters 268, 271, 276, 284 and 290, NAND gates 275, 283 and 286, flip-flops 272, 274 281, 282 and 277, and registers 287–289 comprise peak detector 27 of FIG. 2.

The output of NAND gate 286 is applied through a 3.01K-ohm resistor 292 to the negative input of a differential amplifier 293. The negative input of amplifier 293 also is connected through an 1.50K-ohm resistor 294 to the output of the amplifier, and through a 15K-ohm resistor 295 to the output of a differential amplifier 296. The positive input to amplifier 293 is connected through a 5.10K-ohm resistor 293a to ground.

The output of amplifier 293 in addition is applied through a 10K-ohm resistor 297 to the negative input of a differential amplifier 298, the positive input of which is connected through a 5.10K-ohm resistor 299 to ground.

The output of amplifier 298 is connected through a 10K-ohm resistor 303 to the negative input of amplifier 296, the positive input of which is connected through a 5.10K-ohm resistor 304 to ground. The negative input of amplifier 298 also is connected through a 10K-ohm resistor 300 to the output of a differential amplifier 301, and through a 9.10 picofarad capacitor 302 to the output of amplifier 298.

The negative input to amplifier 296 in addition is connected through a 10K-ohm resistor 305 to the output of the amplifier, and through resistor 305 and a 1.0K-ohm resistor 306 to the positive input of a differential amplifier 307. The output of amplifier 296 also is connected through an 1.0K-ohm resistor 308 to the negative input of a differential amplifier 309, and through a 5K-ohm resistor of a potentiometer 310 to the arm of the potentiometer.

The arm of potentiometer 310 in addition is connected through an 1.5K-ohm resistor 311 to the negative input of amplifier 301. The negative input of amplifier 301 also is connected through a 910 picofarad capacitor 312 to the output of the amplifier, while the positive input is connected through a 5K-ohm resistor 313 to ground.

The negative input of amplifier 307 is connected through a 10K-ohm resistor 314 to the $\pm$15 volt source 141, and through an 1.0K-ohm resistor 315 to ground. An enable input 307a of amplifier 307 is connected to ground for a comparator operation. The output of amplifier 307 is applied through an 1.0K-ohm resistor 316 to the voltage source 133, and through an inverter 317 to a conducting line 318 leading to filter logic unit 32.

The positive input to amplifier 309 is connected through a 2.7K-ohm resistor 319 to ground, and through an 100K-ohm resistor 320 to the output of the amplifier. An enable input 309a of the amplifier is connected to ground for a comparator operation. The output of amplifier 309 also is connected to the voltage source 133 by way of an 1.0K-ohm resistor 321, and is applied through inverters 322 and 323 to a conducting line 324 leading to filter logic 32.

Amplifiers 293, 296, 298, 301, 307 and 309 with their associated networks, and inverters 317, 322 and 323 comprise filter 31 of FIG. 2.

During the reading of bar code information, a differentiated input video signal is carried by line 260 from the output of amplifier 106 of FIG. 4 to the input of peak detector 27 of FIG. 6. When a positive to negative zero crossing is detected in the differentiated signal, the presence of a bar signal is indicated by the appearance of an amplitude and width normalized pulse at the output of gate 286. More particularly, at the time of a zero crossing during a positive to negative transition in the differentiated video signal, an amplitude normalized pulse is provided at the output of amplifier 262 and applied to the D input of flip-flop 272. Flip-flops 272 and 274 comprise a leading edge detector which, upon detecting a leading edge, issues a pulse through inverter 276 to set J-K flip-flop 277. The J-K flip-flop provides an output pulse having a width which is approximately equal to the width of the negative portion of the differentiator 23 output.

Amplifier 264 compares the differentiated input video signal on line 260 with the fixed threshold value provided by resistors 278 and 279. During a negative to positive transition of the video signal, a difference voltage is applied to the D input of flip-flop 281 when the positive input to amplifier 264 exceeds the threshold value at the negative input of the amplifier. Flip-flops 281 and 282 comprise a leading edge detector which, upon the occurrence of a leading edge of a positive half-cycle, applies a pulse through inverter 284 to reset J-K flip-flop 277. The pulse generated by the flip-flop 277 is a pulse having a width one-half that of a detected bar signal.

The output of flip-flop 277 is applied to a 24 bit pulse-width normalizer comprising 8 bit shift registers 287, 288 and 289, inverter 290 and NAND gate 286. The pulse-width normalizer acts as a high frequency compensator, wherein pulses having a pulse width less than 24 bits are not normalized. Those pulses having a greater than 24 bit pulse width, however, are normalized to a 24 bit width.

The normalized pulse at the output of NAND gate 286 is applied to bandpass filter 31. A pulse stream of four pulses, however, normally is required for the filter to reach its steady state output. When a pulse stream is applied to filter 31, therefore, an output envelope between zero and the steady state amplitude is produced at the output of amplifier 296. Amplifier 307, connected for a compare operation, is set with a threshold value equal to 30% of the steady state amplitude as provided by resistors 314 and 315. When the output of amplifier 296 is of an amplitude greater than 30% of the steady state value of the filter, amplifier 307 produces a symmetrical square wave at twice the input data rate. In the preferred embodiment disclosed herein, the input data rate is 13.2 KHz, and the frequency of the square wave at the output of amplifier 307 is 26.4 KHz.

The output of amplifier 296 further is applied through amplifier 309, which is connected for a comparator operation. The reference threshold at the positive input of the amplifier is set by resistors 319 and 320. Unlike the square wave produced at the output of amplifier 307, the square wave at the output of amplifier 309 is a symmetrical 26.4 KHz waveform.

FIG. 7

Figure 7:
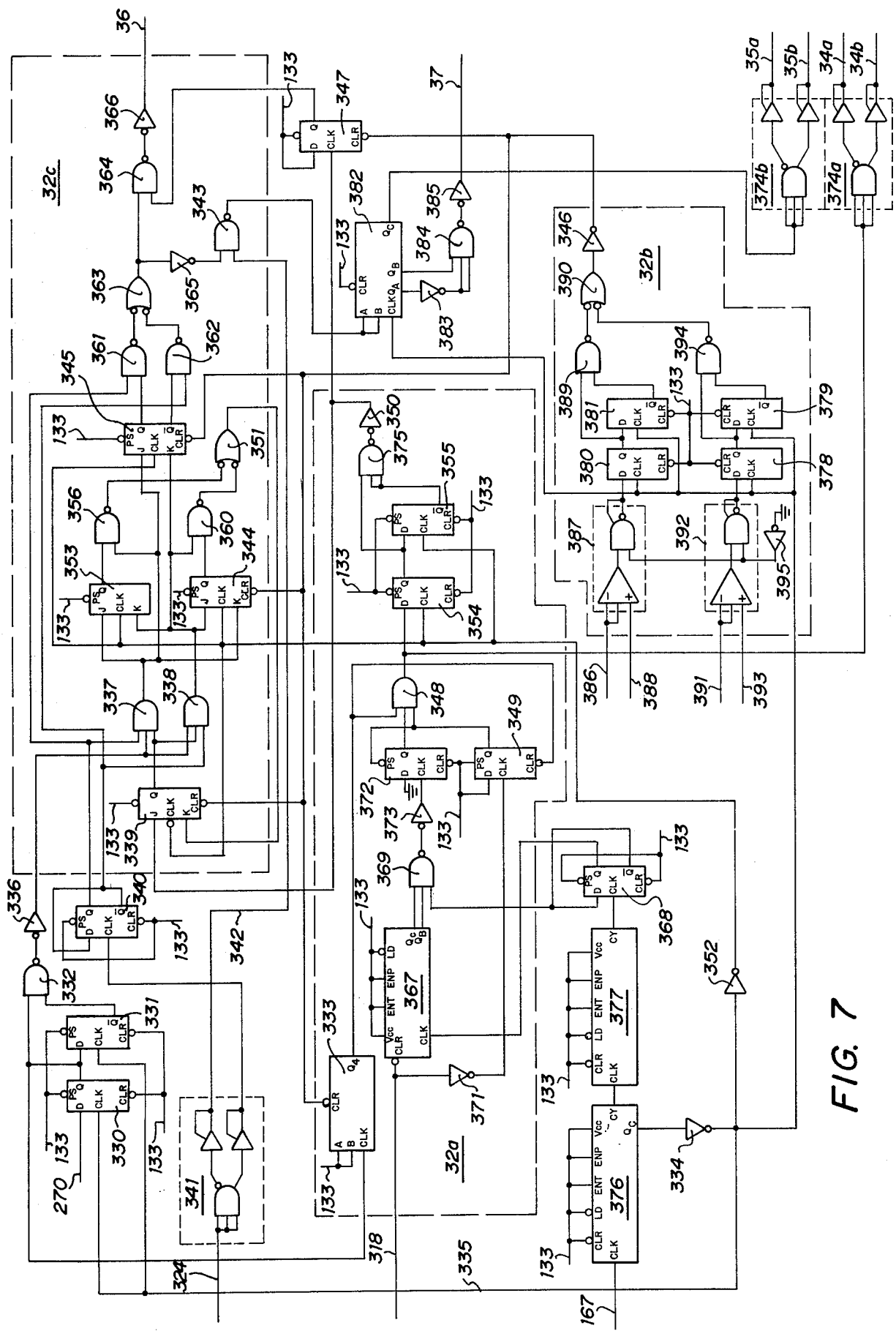
FIG. 7 is an electrical schematic diagram of a filter logic unit comprising a part of the ringer filter synchronizer of FIG. 2.

FIG. 7 illustrates in electrical schematic diagram form the filter logic unit 32 of FIG. 2.

The output of inverter 269, FIG. 6, is applied along line 270 to the D input of a flip-flop 330, the preset (PS) and clear (CLR) inputs of which are each connected to the +5 volt source 133. The Q output of flip-flop 330 is applied to the D input of a flip-flop 331, to one input of a NAND gate 332 and to the clock (CLK) input of an eight bit shift register 333. The preset and clear inputs to flip-flop 331 are each connected to voltage source 133, and the $\overline{Q}$ output of the flip-flop is connected to a second input of NAND gate 332. The clock inputs to flip-flops 330 and 331 are each connected by way of a conducting line 335 to the output of an inverter 334.

The output of NAND gate 332 is applied through an inverter 336 to one input each of AND gates 337 and 338. A second input to each of AND gates 337 and 338 is provided by the Q output of a flip-flop 339. A third input to AND gate 337 is provided by the Q output of a flip-flop 340, and the third input to AND gate 338 is provided by the $\overline{Q}$ output of flip-flop 340. The $\overline{Q}$ output of flip-flop 340 also is connected to the D input of the flip-flop, and the preset and clear inputs to the flip-flop are each connected to the voltage source 133.

The output of inverter 323, FIG. 6, is applied along line 324 to the inputs of a line driver 341. The true output of the line driver is applied to the clock input of flip-flop 340, while the inverted output of the line driver is applied by way of a conducting line 342 to one input of a NAND gate 343.

The output of NAND gate 343 is applied to the A and B inputs of shift register 382. The clear input to register 382 is connected to voltage source 133. The QA output of the register is applied through an inverter 383 to two inputs of a NAND gate 384, and the QB output of the register is connected as a third input to NAND gate 384. The output of NAND gate 384 is applied through an inverter 385 and along line 37 to provide an end of bar time period signal, and to reset internal devices of the reading system. The QE output of register 382 is applied to three inputs of a differential line driver 374b. The inverted output of driver 374b is applied along a conducting line 35a and the true output is applied along a conducting line 35b to a transport control system (not shown). A data strobe pulse is provided thereby once during each bar time period to clock data out of decision logic 30 and along conducting line 38 of FIG. 2.

The A and B inputs to shift register 333 are each connected to positive voltage source 133, while the clear input is joined with the clear inputs of J-K flip-flop 339, a J-K flip-flop 344, and a J-K flip-flop 345 to the output of an inverter 346. The output of inverter 346 also supplies a clear input to a flip-flop 347. The Q4 output of shift register 333 is connected to one input of an AND gate 348, and to the clear input of a flip-flop 349.

The J input to flip-flop 339 is supplied by an inverter 350, which also supplies a clock signal to flip-flop 347. The K input to flip-flop 339 is connected to the output of a NOR gate 351, while the clock input to the flip-flop is connected to the output of an inverter 352. The inverter 352 also supplies clocking signals to the clock inputs of J-K flip-flops 353, 345 and 344, and flip-flops 354 and 355.

The output of AND gate 337 is applied to the J input of flip-flop 353, to the K input of flip-flop 344, to one input of a NAND gate 356, and to the J input of flip-flop 345. The output of AND gate 338 is connected to the K input of flip-flop 353, to the J input of flip-flop 344, to one input of a NAND gate 360, and to the K input of flip-flop 345. The preset inputs to flip-flops 353 and 344 are each connected to positive voltage source 133. The Q output of flip-flop 353 is connected to a second input of NAND gate 356, and the Q output of flip-flop 344 is connected to a second input of NAND gate 360. The output of NAND gate 356 is connected to one input of a NOR gate 351, while the output of NAND gate 360 is connected to a second input of the NOR gate.

The Q output of flip-flop 345 is applied to one input of a NAND gate 361 having a second input supplied by the Q output of flip-flop 340. The $\overline{Q}$ output of flip-flop 345 is connected to one input of a NAND gate 362, a second input of which is connected to the $\overline{Q}$ output of flip-flop 340. The preset input to flip-flop 345 is connected to the positive voltage source 133.

The outputs of NAND gates 361 and 362 are connected to one input each of a NOR gate 363, the output of which is applied to one input of a NAND gate 364 and through an inverter 365 to a second input of NAND gate 343. The output of NAND gate 364 is applied through an inverter 366 to line 36. The second input to NAND gate 364 is supplied by the Q output of flip-flop 347, the D and preset inputs of which are connected to +5 volt source 133.

The output of inverter 317, FIG. 6, is applied along line 318 to the clear input of a four bit counter 367, the clock input to which is supplied by the Q output of a flip-flop 368. The load (LD), enable (ENT, ENP) and power (VCC) inputs to counter 367 are each connected to voltage source 133. The QC output of counter 367 is connected to one input of a NAND gate 369, a second input of which is connected to the QB output of the counter. A third input to NAND gate 369 is supplied by the $\overline{Q}$ output of flip-flop 368, which also is connected to the D input of the flip-flop. The preset and clear inputs to flip-flop 368 are each connected to the +5 volt source 133.

Line 318 also is connected by way of an inverter 371 to the clock input of flip-flop 349, the Q output of which is connected to a second input of AND gate 348 and to the preset input of a flip-flop 372. The D input of flip-flop 349 is connected to its preset input, to the clear input of flip-flop 372, and to the voltage source 133. The Q output of flip-flop 372 is connected to a third input of AND gate 348, and the D input to the flip-flop is connected to ground. The clock input of flip-flop 372 is supplied by NAND gate 369 of an inverter 373.

The output of AND gate 348 is connected to the D input of a flip-flop 354 and to three inputs of a line driver 374a providing a signal along lines 34a and 34b to indicate the occurrence of an acceptable filter envelope within bandpass filter 31 of FIG. 2. The occurrence of such a signal initializes a transport control system (not shown) for the reception of NRZ data soon to be transferred along line 38 of FIG. 2.

The preset and clear inputs of flip-flop 354 are each connected to voltage source 133. The Q output of the flip-flop 354 is connected to the D input of flip-flop 355 and to one input of a NAND gate 375. An additional two inputs of gate 375 are provided by the $\overline{Q}$ output of flip-flop 355, the preset and clear inputs of which are connected to voltage source 133. The output of NAND gate 375 is connected to the input of inverter 350.

A 6.758 MHz signal from a crystal oscillator (not shown) is supplied along line 167 to the clock input of a four bit counter 376. The clear, load, enable and power inputs of counter 376 are each connected to the +5 volt source 133. The CY output of counter 376 provides a clocking signal to the clock input of a four bit counter 377. The QC output of counter 376 is applied to the input of inverter 334, the output of which also is connected to the input of inverter 352. The output of inverter 334 in addition is connected to the clock inputs of a flip-flop 378, a flip-flop 379, a flip-flop 380, a flip-flop 381, and to the clock input of shift register 382.

The clear, load, enable and power inputs of counter 377 are each connected to voltage source 133. The CY output of counter 377 is applied as a clock input to flip-flop 386, the preset and clear inputs of which are each connected to voltage source 133.

A signal generated by document tracking logic (not shown) is applied along a conducting line 386 to two negative inputs of a differential line receiver 387. The inverse of the signal is applied along a conducting line 388 to the positive input of receiver 387. The signal on line 386 is high from a time just prior to the presence of a document at a read station, and remains high while the document passes through registration with the read station. The output of receiver 387 is applied to the D input of flip-flop 380.

The clear input of flip-flop 380 is connected to the clear inputs of flip-flops 378, 379 and 381, and to the voltage source 133. The Q output of flip-flop 380 is connected to the D input of flip-flop 381 and to one input of a NAND gate 389. A second input to NAND gate 389 is supplied by the $\overline{Q}$ output of flip-flop 381. The output of NAND gate 389 in turn is connected to one input of a NOR gate 390.

After the end of a first data field on a document passes through registration with a reading station, a signal is generated by the document tracking logic along a conducting line 391 and applied to two negative inputs of a differential line receiver 392. The signal remains high after the end of a first data field on a document for the duration of the document's presence at a read station. The inverse of the signal is applied along a conducting line 393 to the positive input of receiver 392. The output of receiver 392 is applied to the D input of flip-flop 378, the Q output of which is applied to the D input of flip-flop 379 and to one input of a NAND gate 394. The $\overline{Q}$ output of flip-flop 379 is applied to a second input of NAND gate 394, and the output of gate 394 in turn is applied to a second input of NOR gate 390. The output of NOR gate is connected to the input of inverter 346.

In operation, the system of FIG. 7 receives the 26.4 KHz signal carried by line 324, and converts the signal to a digital synchronization signal which is applied to decision logic unit 30. More particularly, a signal is received on line 270 from peak detector 27 of FIG. 6 to indicate the presence of a bar signal peak. The signal is applied to the leading edge detector comprised of flip-flops 330 and 331, which clocks a logic one into shift register 333 upon detecting the leading edge of a bar signal peak. When four bar signal peaks are detected, the Q4 output of the shift register transitions to a logic one which is applied to AND gate 348 and to the clear input of flip-flop 349.

When the output amplitude of amplifier 296, FIG. 6, exceeds 30% of the steady state amplitude of filter 31, an asymmetrical square wave is received by way of line 318. Counter 367 is cleared thereby, and flip-flop 349 is clocked. The Q output of flip-flop 349 transitions to a logic one to disable the preset input of flip-flop 372 and enable AND gate 348. The output of AND gate 348 transitions thereby to a logic one which is applied to line driver 374a, and to the edge detector comprised of flip-flops 354 and 355. Upon the occurrence of a next clock signal, the Q output of flip-flop 354 transitions to a logic one which is applied through inverter 350 to clock flip-flop 347 and to set J-K flip-flop 339. Shift register 333, counter 367, flip-flops 349, 372, 354 and 355, NAND gates 369 and 375, AND gate 348, and inverters 371, 373 and 350 comprise a false start protection circuit 32a.

J-K flip-flop 339 is not set, and flip-flop 347 is not clocked until four of ten leading bars preceding a data field are detected and a pulse train is received on line 318. The detection of four peaks, however, cannot take place until after a system reset has occurred.

System reset circuit 32b is comprised of line receivers 387 and 392, flip-flops 380, 381, 378 and 379, NAND gates 389 and 394, NOR gate 390, and inverters 346 and 395. The document tracking logic (not shown) supplies the true and inverse form of a document presence signal to line receiver 387, and the true and inverse form of an end of field signal to line receiver 392. The document presence signal transitions to a logic one as a document reaches a read station, and remains at a logic one while the document passes through registration with the read station. The end of field signal transitions to a logic one after the end of a first data field has been read. The outputs of the line receivers 387 and 392 are applied to the D inputs of flip-flops 380 and 378, respectively.

Flip-flops 380 and 381 comprise a leading edge detector, as do flip-flops 378 snd 379. Thus, when the leading edge of a document presence signal is detected, the output of NAND gate 389 transitions to a logic zero. In like manner, the output of NAND gate 394 transitions to a logic zero when the leading edge of an end of field signal is detected. The occurrence of a logic zero at the output of either gate 389 or gate 394 causes the output of inverter 346 to transition to a logic zero. Flip-flops 347, 345, 344 and 339, and shift register 333 are cleared thereby to disable gate 364 and reset the system of FIG. 7.

When the pulse train on line 318 is removed, counter 367 begins to count, and 380 microseconds later flip-flop 372 is clocked to disable AND gate 348. If a pulse train is received on line 318 and four of 10 preceding bar peaks are detected after a system reset occurs, however, flip-flop 339 is set by circuit 32a and flip-flop 347 is clocked to enable gate 364.

The 26.4 KHz signal supplied by filter 31 of FIG. 2 on line 324 is halved by flip-flop 340. The true 13.2 KHz signal resulting from the division may appear at either the Q or $\overline{Q}$ outputs of the flip-flop. A true decision circuit 32c is employed to select either the Q or the $\overline{Q}$ output of flip-flop 340 as the source for a 13.2 KHz signal. Circuit 32c is comprised of AND gates 337 and 338, NAND gates 356, 360, 361, 362, 343 ad 364, NOR gates 351 and 363, inverters 365 and 366, and flip-flops 339, 344, 345 and 353.

Upon the detection of a bar signal peak on line 270 as before described, the output of inverter 336 transitions to a logic one which is applied to gates 337 and 338. Further, when the J input of flip-flop 339 is enabled, the Q output of the flip-flop transitions to a logic one upon the next occurrence of a clock signal. With the Q output of flip-flop 339 and the output of inverter 336 both in a logic one state, gates 337 and 338 are enabled alternately by the Q ad $\overline{Q}$ outputs of flip-flop 340.

If two consecutive pulses occur at either the Q or the $\overline{Q}$ output of flip-flop 340 before an intermediate pulse occurs at the other output, flip-flops 339, 353, 344 and 345 remain in their respective states at the time of such occurrence. For example, when a first pulse occurs at the Q output of flip-flop 340, gate 337 is enabled as is the J input of flip-flop 353. Upon the occurrence of a next clock pulse, the Q output of flip-flop 353 transitions to a logic one state. If the next occurring 13.2 KHz pulse appears at the Q output of flip-flop 340, the pulse is gated through gate 337 and gate 356 to NOR gate 351. The output of gate 351 thereby is raised to a logic one state, which is applied to the K input of flip-flop 339. Upon the next occurrence of a clock pulse, the Q output of flip-flop 339 transitions to a logic zero. The outputs of AND gates 337 and 338 in turn transition to a logic zero, thereby placing flip-flops 353, 344 and 345 in a hold state. The Q output of flip-flop 340 thereafter is gated through NAND gate 361 and NOR gate 363.

When two consecutive pulses appear at the $\overline{Q}$ output of flip-flop 340 before a pulse appears at the Q output thereof, AND gate 338, flip-flop 344 and NAND gate 360 work in an analogous manner to place flip-flops 344, 353 and 345 in a hold state. Thereafter, the $\overline{Q}$ output of flip-flop 340 is gated through NAND gate 362 and NOR gate 363.

The selected output of flip-flop 340 is gated through NAND gate 364 to line 36 so long as the Q output of flip-flop 347 is at a logic one state. As before described, the Q output of the flip-flop does not transition to a logic one state until the output of inverter 350 enables the J input of flip-flop 339.

The signal on line 36 is a digital synchronization signal which defines the bar time periods, and the logic one window within each such time period. The inverse of the synchronization signal is combined with the 26.4 KHz signal on line 324, and applied to the A and B inputs of shift register 382. The QA and QB outputs of register 382 in turn are combined at NAND gate 384, and applied to the input of inverter 385. The output of inverter 385 thereby indicates the occurrence of an end of a trailing edge of a bar signal located in the logic one window of a bar time period. Such indication is used to reset integrators 25 and 26 of FIG. 2. The QE output of register 382 is applied through driver 374b to lines 35a and 35b, which provide a data strobe to the transport control system (not shown).

The clock signals for operating the logic unit 32 are provided by counters 376 and 377, and flip-flop 368. A crystal oscillator (not shown) generates a 6.758 MHz signal which is applied to the clock input of counter 376. An 838.4 KHz signal derived therefrom is provided at the QC output of counter 376, while an asynchronous signal comprising one pulse per bar time period is provided at the Q and $\overline{Q}$ outputs of flip-flop 368.

As before described, the logic unit 32 receives a 26.4 KHz signal on line 324, and develops a 13.2 KHz digital synchronization signal which is carried by line 36 to the decision logic unit 30. For each half of a bar time period, one cycle of the 26.4 KHz signal occurs. The 26.4 KHz signal is divided by two, and sampled so as to provide a logic one amplitude during the logic one window of a bar time period. The 13.2 KHz signal thereby is synchronized with the input video signal.

FIGURE 8

The system illustrated in FIG. 2 accommodates the reading of biphase modulated bar code data fields. To accommodate a bar-no-bar modulated data field wherein a bar represents a logic one and the absence of a bar in a bar time period represents a logic zero, the system of FIG. 2 is modified as illustrated by the functional block diagram of FIG. 8. As may be seen from a comparison of FIGS. 2 and 8, filter 21, AGC circuit 22 and differentiator 23 are replaced by an AGC circuit 22a.

The output of converter 20 is applied to a first input of a DC coupled, voltage-controlled amplifier 400. The output of amplifier 400 is connected to the input of a DC offset compensation circuit 401, and to the input of a differentiator 403. The output of circuit 401 in turn is connected to a second input of amplifier 400. The output of differentiator 403 is connected to conducting line 23a, and further connected to the input of a low pass filter 402 having an amplitude reference voltage therein. The output of filter 402 is applied to a third input of amplifier 400.

FIGURE 9

Figure 8:
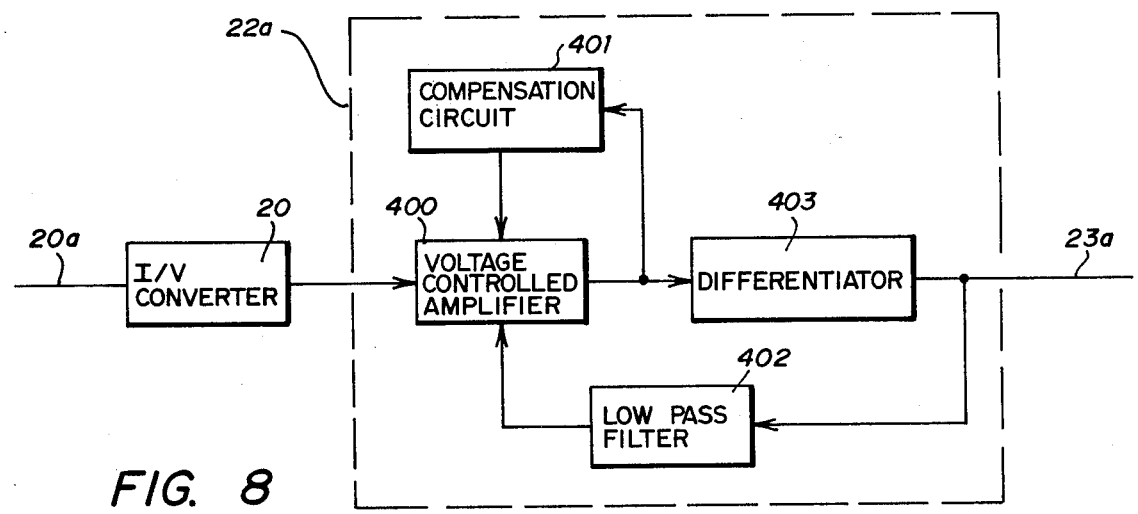
FIG. 8 is a functional block diagram of a signal conditioner to be employed in the reading of bar-no-bar data formats.
Figure 9:
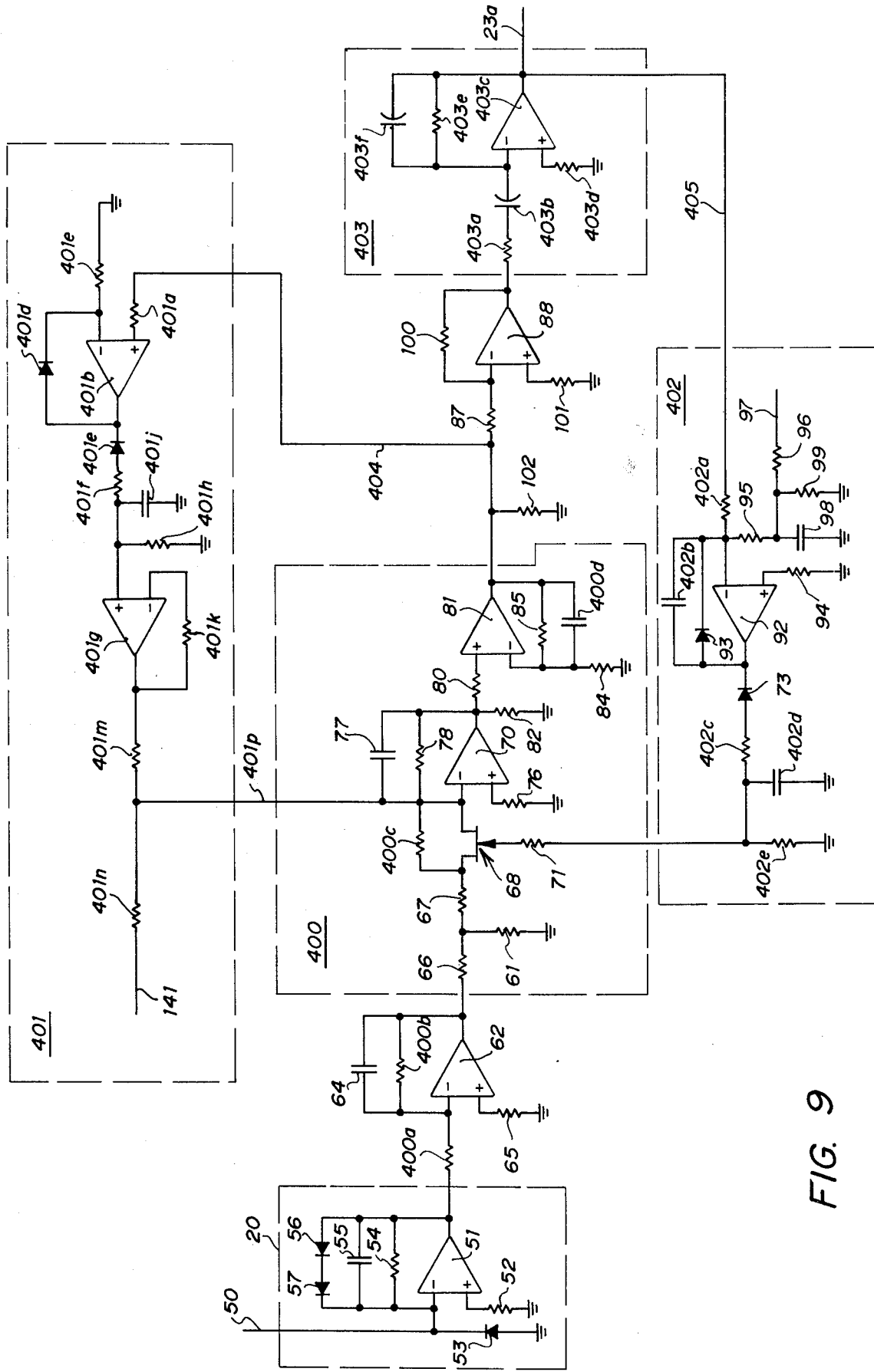
FIG. 9 is an electrical schematic diagram of the signal conditioner of FIG. 8.

A detailed electrical schematic diagram of the AGC circuit 22a of FIG. 8 is illustrated in FIG. 9.

As before described, an input video signal on line 50 is converted to a voltage waveform by converter 20.

The output of amplifier 51 of converter 20 is applied through an 18K-ohm resistor 400a to the negative input of amplifier 62. In addition, a 3.9K-ohm resistor 400b is connected in parallel to capacitor 64. A 6.8K-ohm resistor 400c is connected between the drain and source terminals of FET 68, and a 240 picofarad capacitor 400d is connected between the output and negative input of amplifier 81. As may be seen by inspection of FIG. 4, resistor 60 has been replaced by resistor 400a, capacitor 61 has been deleted, resistor 63 has been replaced by resistor 400b, resistor 400c has been added, capacitor 79 has been deleted, capacitor 83 has been replaced by capacitor 400d, and capacitor 86 has been deleted. Amplifiers 62, 70 and 81 with their associated networks as modified above form voltage controlled amplifier 400 of FIG. 8.

The output of amplifier 81 is applied by way of a conducting line 404 through a 10K-ohm resistor 401a to the positive input of a differential amplifier 401b. As before described, the output of amplifier 81 also is applied through resistor 87 to the negative input of amplifier 88. The output of amplifier 88 is applied through a 3K-ohm resistor 403a and a 390 picofarad capacitor 403b to the negative input of a differential amplifier 403c. The positive input of amplifier 403c is connected through a 56K-ohm resistor 403d to ground. The output of amplifier 403c is connected to line 23a, and through a parallel circuit comprising a 56K-ohm resistor 403e and a 56 picofarad capacitor 406f to the negative input of the amplifier. Resistors 403a, 403d and 403e, capacitors 403b and 403f, and amplifier 403c comprise differentiator 403 of FIG. 8.

By a comparison with FIG. 4, it may be seen that the output of amplifier 81 is no longer applied to the negative input of amplifier 92, and that a new conducting line 404 has been added. In addition, a differentiator circuit 403 has replaced differentiator 23 of FIG. 4.

The output of amplifier 403c further is applied along a conducting line 405 and through a 6.8K-ohm resistor 402a to the negative input of amplifier 92. The output of amplifier 92 is connected through a 680 picofarad capacitor 402b to the negative input of the amplifier. The output of amplifier 92 also is applied through diode 73 and a 3.3K-ohm resistor 402c to one terminal of a 0.1 micofarad capacitor 402d, a second terminal of which is connected to ground. The first terminal of capacitor 402d also is connected through a 390K-ohm resistor 402e to ground, and through resistor 71 to the gate terminal of FET 68. A comparison with FIG. 4 discloses that resistor 91 has been replaced by resistor 402a, capacitor 402b has been added, resistor 72 has been replaced by resistor 402c, capacitor 75 has been replaced by capacitor 402d, and resistor 74 has been replaced by resistor 402e. Resistors 94, 95, 96, 99, 402a, 402c and 402e, capacitors 402b, 402d and 98, diodes 73 and 93, and amplifier 92 comprise low pass filter 402 of FIG. 8.

The negative input to amplifier 401b is connected through a 10K-ohm resistor 401c to ground, and to the cathode of a diode 401d. The anode of diode 401d is connected to the output of the amplifier, and to the cathode of a diode 401e. The anode of diode 401e in turn is connected through a 3.3K-ohm resistor 401f to the positive input of a differential amplifier 401g. The positive input to amplifier 401g also is connected through an 1.0M-ohm resistor 401h to ground, and to one terminal of an 1.0 microfarad capacitor 401j having a second terminal connected to ground. The negative input to amplifier 401g is connected through a 2.2K-ohm resistor 401k to the output of the amplifier. The output of amplifier 401g also is connected through an 82K-ohm resistor 401m and an 150K-ohm resistor to the $-15$ volt source 141. A node intermediate to resistors 401n and 401m is connected by way of a conducting line 401p to the negative input of amplifier 70. Amplifiers 401b and 401g together with their associated networks comprise compensation circuit 401 of FIG. 8.

During a reading of a bar-no-bar modulated bar code data field, an input video signal is converted to a voltage waveform by converter 20. Amplifier 62 attenuates the waveform to an amplitude suitable for input to the voltage controlled amplifier 400. Amplifier 400 in turn amplifies the signal for input to the differentiator 403, which removes low frequency noise.

Differentiator 403 provides an output proportional to the amplitude of the input data signal rather than the data signal plus low frequency noise. The differentiator output is applied through low pass filer 402, where the differentiator output is compared against a fixed reference voltage as set by resistors 96 and 99. The output of amplifier 92 affects the gain of amplifier 400, and thereby effects an amplitude normalization of the input video signal.

The $+15$ voltage source 141 acts in cooperation with resistor 401n to cause the outputs of amplifiers 70 and 81 to become negative. The output of amplifier 81 is applied to the positive input of amplifier 401b and compared to ground. The difference voltage causes the output of amplifier 401b to become negative. Diode 401e thus conducts to charge capacitor 401j. The output of amplifier 401g in turn becomes negative to force the output of amplifier 70 to become more positive. Thus, the amplifier 400 is provided a DC offset compensation about ground level.

When a low frequency pedestal voltage is superimposed upon an input video signal, the output of amplifier 62 becomes more negative, and thus forces the output of amplifier 70 to become more positive. The output of amplifier 81 in turn becomes more positive to force the output of amplifier 401b positive. With diode 401e non-conducting, capacitor 401j discharges to force the output of amplifier 401g to slowly decay to ground.

FIGURE 10

Figure 10:
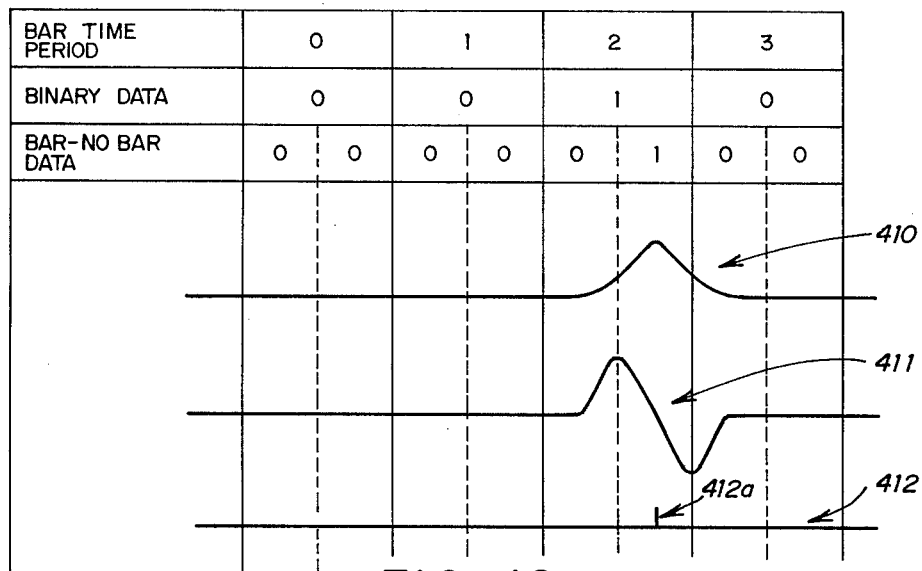
FIG. 10 is a timing diagram of waveforms illustrating the operation of the signal conditioner of FIG. 8.

FIG. 10 is a timing and waveform diagram illustrating the operation of the signal conditioner of FIG. 8.

Waveform 410 is a voltage waveform provided at the output of converter 20 in response to the sensing of the bar-no-bar modulated code illustrated in FIG. 10. Waveform 411 illustrates the bipolar output of AGC circuit 22a on line 23a formed in response to waveform 410. Waveform 412 in turn illustrates the outputs of peak detectors 24 and 27, wherein the occurrence of a zero-crossing in a positive to negative transition of waveform 411 is indicated by a pulse 412a. The remaining operations of the bar code reading system occur as before described.

In accordance with the invention, a bar code reading method and system is provided to accommodate both bar-no-bar, and biphase modulated data fields. Low frequency noise and the effects of intersymbol interferences which may occur in the reading of biphase modulated data fields are substantially eliminated from a sensor generated signal, and both leading and trailing edge detection of a bar signal is employed to improve the reliability of the system. When a bar signal is detected, the time of occurrence of a bar signal peak is correlated with a synchronization signal derived from clocking information inherent to the sensor signal. The logical window of a bar time period during which a bar signal is detected thereby may be identified.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A method of reading biphase modulated bar codes by detecting leading and trailing edges of bar signals occurring in an information signal generated by an optical sensor, which comprises:
   a. attenuating high and low frequency noise and uniformly shaping said information signal;
   b. differentiating said information signal to further remove low frequency noise, and to form a bipolar waveform for both leading and trailing edge detection of said bar signals;
   c. separating and integrating positive and negative half-waves of said bipolar waveform to substantially remove the effects of intersymbol interferences which may occur from the sensing of adjacent bars in a bar encoded data field;
   d. comparing integrals of said positive and said negative half-waves with a reference amplitude to detect one of said bar signals;
   e. forming a digital synchronization waveform from said bipolar waveform to define a continuous train of bar time periods;
   f. signaling the occurrence of a zero-crossing in a positive to negative transition of said bipolar waveform; and
   g. when the amplitude of one of said integrals equals said reference amplitude, correlating the time of occurrence of said zero-crossing with said digital synchronization waveform to identify the half period position of said one of said bar signals within one of said continuous train of bar time periods.

2. The method set forth in claim 1, including the step of signaling the presence of said one of said bar signals in a trailing half period of said one of said continuous train of bar time periods.

3. The method set forth in claim 1, wherein the step of forming a digital synchronization waveform from said bipolar waveform includes the steps of:
   a. detecting a plurality of waveform peaks in said bipolar waveform;
   b. generating a pulse train normalized in both amplitude and width upon detecting said plurality of waveform peaks;
   c. generating an analog waveform in response to said pulse train, said analog waveform having a frequency twice that of said information signal to accommodate the reading of biphase modulated bar codes; and
   d. digitizing said analog waveform.

4. In a bar code detection system having sensors for generating an input video signal including bar signals representing printed fluorescent bars appearing in a phase modulated bar encoded data field, and further having a signal conditioning means for stabilizing said input video signal, the combination which comprises:
   a. a differentiating means operating upon the output of said signal conditioning means for suppressing high and low frequency noise, and for forming a bipolar waveform to accommodate both leading and trailing edge detection of said bar signals;
   b. peak detection means connected to the output of said differentiating means for detecting a zero-crossing in a positive to negative transition of said bipolar waveform;
   c. integration means under the control of said peak detection means for separately operating upon the positive and negative half-waves of said bipolar waveform to substantially remove the effects of intersymbol interferences which may occur from the sensing of adjacent bars in said phase modulated bar encoded data field;
   d. synchronizing means operating upon said bipolar waveform to form a synchronization waveform for defining bar time periods during which said bar signals may occur; and
   e. logic circuit means accepting inputs from said peak detection means, said integration means, and said synchronizating means for detecting said bar signals and identifying the location of said bar signals within said bar time periods.

5. The combination set forth in claim 4, wherein said synchronization means includes:
   a. means responsive to the occurrence of said zero-crossing for generating a pulse train;
   b. bandpass filter means responsive to said pulse train for generating an analog waveform having twice the frequency of said input video signal; and
   c. filter logic means for digitizing said analog waveform to form said synchronization waveform.

6. A bar code reading system having optical sensors for scanning a bar encoded data field, which comprises:
   a. signal conditioning means receiving a sensor generated signal for forming an input video signal having a constant reference level within an amplitude envelope of constant magnitude;
   b. differentiating means operating upon said input video signal to provide a bipolar waveform accommodating both a leading and a trailing edge detection of a bar signal representing the occurrence of a bar in said bar encoded data field;
   c. first peak detection means operating upon said bipolar waveform for generating a pulse train;
   d. filter means responsive to said pulse train for generating an analog waveform at twice the frequency of said input video signal;
   e. filter logic means connected to the output of said filter means for digitizing said analog waveform to form a digital synchronization signal;
   f. second peak detection means connected to the output of said differentiating means for detecting a zero-crossing in a positive to negative transition of said bipolar waveform;
   g. first half-wave integrating means under the control of said second peak detection means for integrating negative half-waves of said bipolar waveform, thereby accommodating said trailing edge detection of said bar signal;
   h. second half-wave integrating means under the control of said second peak detection means for integrating positive half-waves of said bipolar waveform, thereby accommodating said leading edge detection of said bar signal; and i. decision logic means responsive to said first and said second half-wave integrating means for detecting the presence of said bar signal and correlating the output of said second peak detection means with said digital synchronization signal.

7. The combination set forth in claim 6, wherein for reading phase modulated bar encoded data fields said signal conditioning means includes in series:
   a. a current to voltage converter;
   b. bandpass filter means for suppressing both high and low frequencies; and
   c. automatic gain control means for stabilizing said sensor generated signal.

8. The combination set forth in claim 6, wherein for reading bar-no-bar encoded data fields said signal conditioning means includes:
   a. a current to voltage converter;
   b. voltage controlled amplifier means receiving a voltage waveform from said current to voltage converter for normalizing the amplitude of said voltage waveform;
   c. compensation circuit means connected in a feedback loop to said voltage controlled amplifier means for substantially removing DC offsets in said voltage waveform;
   d. differentiating means responsive to the output of said votage controlled amplifier means for forming a bipolar waveform; and
   e. low pass filter means operating upon said bipolar waveform for controlling the gain of said voltage controlled amplifier means.

* * * * *